July 24, 1951

G. V. JOHNSON 2,561,576

LIFT TRUCK

Filed May 31, 1947

INVENTOR.
George V. Johnson
BY
Atty.

July 24, 1951  G. V. JOHNSON  2,561,576
LIFT TRUCK
Filed May 31, 1947  5 Sheets-Sheet 2

INVENTOR.
George V. Johnson
BY
Atty.

July 24, 1951  G. V. JOHNSON  2,561,576
LIFT TRUCK
Filed May 31, 1947  5 Sheets-Sheet 5

INVENTOR.
George V. Johnson
BY
Atty.

Patented July 24, 1951

2,561,576

UNITED STATES PATENT OFFICE 2,561,576

LIFT TRUCK

George V. Johnson, Portland, Oreg., assignor to Transitier Truck Co., Portland, Oreg., a corporation of Oregon Application May 31, 1947, Serial No. 751,510

9 Claims. (Cl. 214—113)

My invention is particularly directed to improvement in so-called lift or fork trucks, by which a load may be engaged from underneath, may be lifted to a convenient height, transported to a distant location and discharged therefrom, all without requiring manual handling.

One of the principal objects of my invention is to provide a device of this character which is compact, is of light weight with respect to its lifting and transporting capacity, one which may turn in a relatively short radius, and one which is comfortable and convenient to operate and maintain.

A further object of my invention is to provide driving mechanism in a self-propelled vehicle of this character in which the clutch element is arranged uppermost and it is thus convenient of access, to promote repair, disassembly, and replacement of worn parts.

A further object of my invention is to provide driving mechanism in a self-propelled vehicle of this character in which the clutch and speed-change device is so arranged with respect to the motor and its power take-off shaft, and with the drive shaft, that compactness may be secured, both with regard to overall height and overall length.

A further object of my invention is to provide driving mechanism in a vehicle of this character in which a disengageable clutch may be provided which will operate at substantially less than engine speed, and thus will not be subject to as great wear or to other operating stresses which would be occasioned if said clutch were running at engine speed.

A further object of my invention is to provide a driving unit between the motor and the drive shaft which permits power to be applied through said parts at a point physically intermediate said parts, yet permitting the latter to operate in proper operating series to produce power engagement and disengagement and speed change in the usual manner.

Another object of my invention is to provide a device of this character in which the parts are arranged with the engine and power transmitting elements in line so that air may be blown by the fan of the engine directly past and over the auxiliary mechanism so as to dissipate the heat generated therein and thus maintain a cool-running unit.

A further object of my invention is to provide a lift truck of this character in which an operator's seat may be arranged atop the frame and with a central ridged frame portion underlying it, said frame portion being of such narrow width that it may easily be straddled by the operator's feet, thus to promote comfort in operation, and said relatively narrow ridge section may serve as an air conduit for directing the cooling blast from the cooling fan of the engine directly rearwardly past the operator's station and the underlying mechanism, so that coolness will be promoted.

A further and more general object of my invention is to provide a lift truck of this character which may be made of such light weight and size with respect to its lifting capacity that it may be used in areas difficult of access and one in which the parts are proportioned and arranged so that an inexpensive, simple and economical machine may be produced.

Other and incidental features of my invention are hereinafter described with reference to the accompanying drawings, in which.

Figure 3:
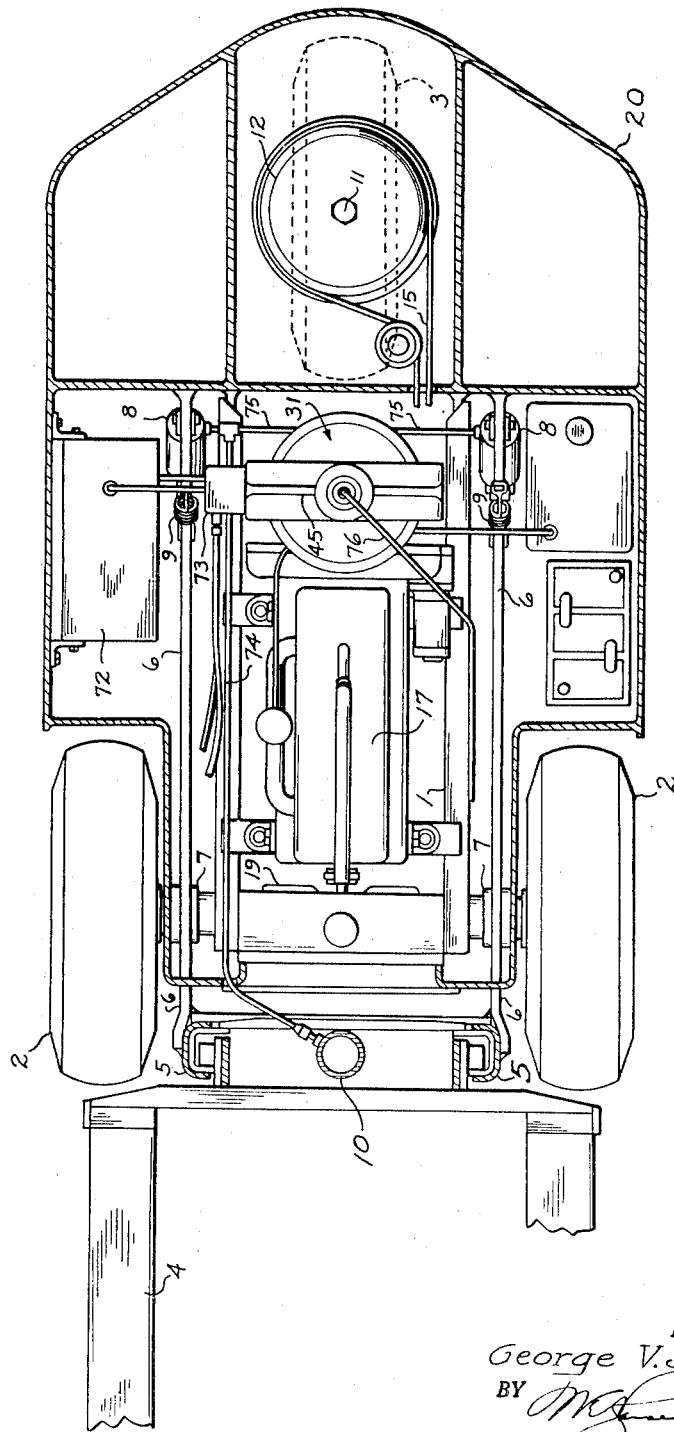
Fig. 3 is a plan section through said machine taken substantially on the line 3—3 in Fig. 1.

A lift truck embodying my invention is supported by a frame 1, preferably supported by two front driving wheels 2, and a rear dirigible steering wheel 3. At the forward end of the truck is a load-engaging fork 4, adjustably mounted between a pair of upright guides 5. Said guides are carried by the free ends of arms 6, pivotally mounted upon the hubs 7, surrounding the drive shaft 7a running between the front driving wheels 2. Said arms are rotatable about said hubs by a pair of selectively operated cylinders 8. Said arms may be rotated counter-clockwise by said cylinders and are retracted counter-clockwise by coiled springs 9. The fork and its supporting base may be lifted and lowered by a cylinder 10 mounted between the upright guides 5, as is illustrated in Fig. 3. All of the foregoing is more or less standard structure in a lift truck and has no direct connection with my invention, but is illustrated and is described to show the general characteristics of a lift truck with which my invention is generally concerned.

The dirigible rear wheel 3 is rotated about a king bolt 11 by a drum 12 fixed thereon. Attached to the lower end of the steering shaft 13 is a pulley 14, and an endless cable 15 makes a couple of turns around said pulley and about the drum 12. Said cable is held taut and is properly positioned by a pair of idler rollers 16. The specific manner in which motion is transmitted from the steering wheel 13a to the dirigible rear wheel 3 is relatively unimportant. The cable pulley and drum structure are typical of a number of different types of connection which may suggest themselves to persons skilled in the art, and merely illustrate one simple and convenient manner for accomplishing this end result.

Figure 1:
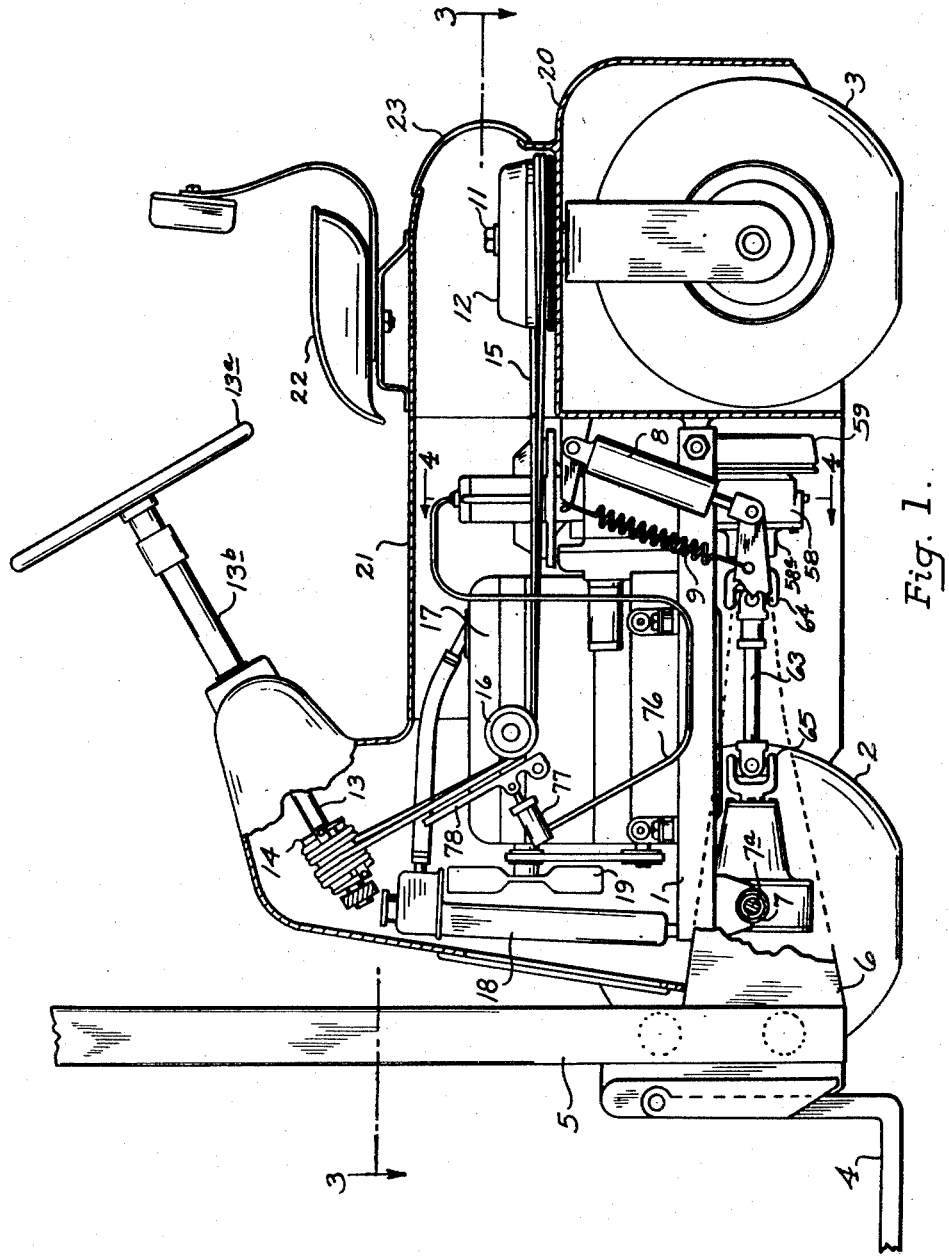
Fig. 1 is a side elevation of a lift truck embodying my invention with certain portions shown broken away to disclose details of my invention.

The lift truck is operated by a motor 17, preferably an internal combustion engine, which is provided with a radiator 19 to cool the water for maintaining the motor at proper temperatures. Said radiator is provided with the usual fan 19 for blowing air through the radiator and cooling the water flowing through the latter. Lying rearwardly of said motor is a combination clutch and speed change device, with which my invention is particularly concerned. It is to be noted, as viewed in Figs. 1 and 3, that the motor, its radiator, and said intermediate power transmitting mechanism comprising said disengageable clutch and speed change device are arranged in longitudinal alinement. Surrounding said operating parts is a body 20 having one ridged section 21 overlying the remainder and arranged centrally thereof. Said ridged section encompasses the top of the motor and the top of the intermediate power transmitting mechanism.

Figure 2:
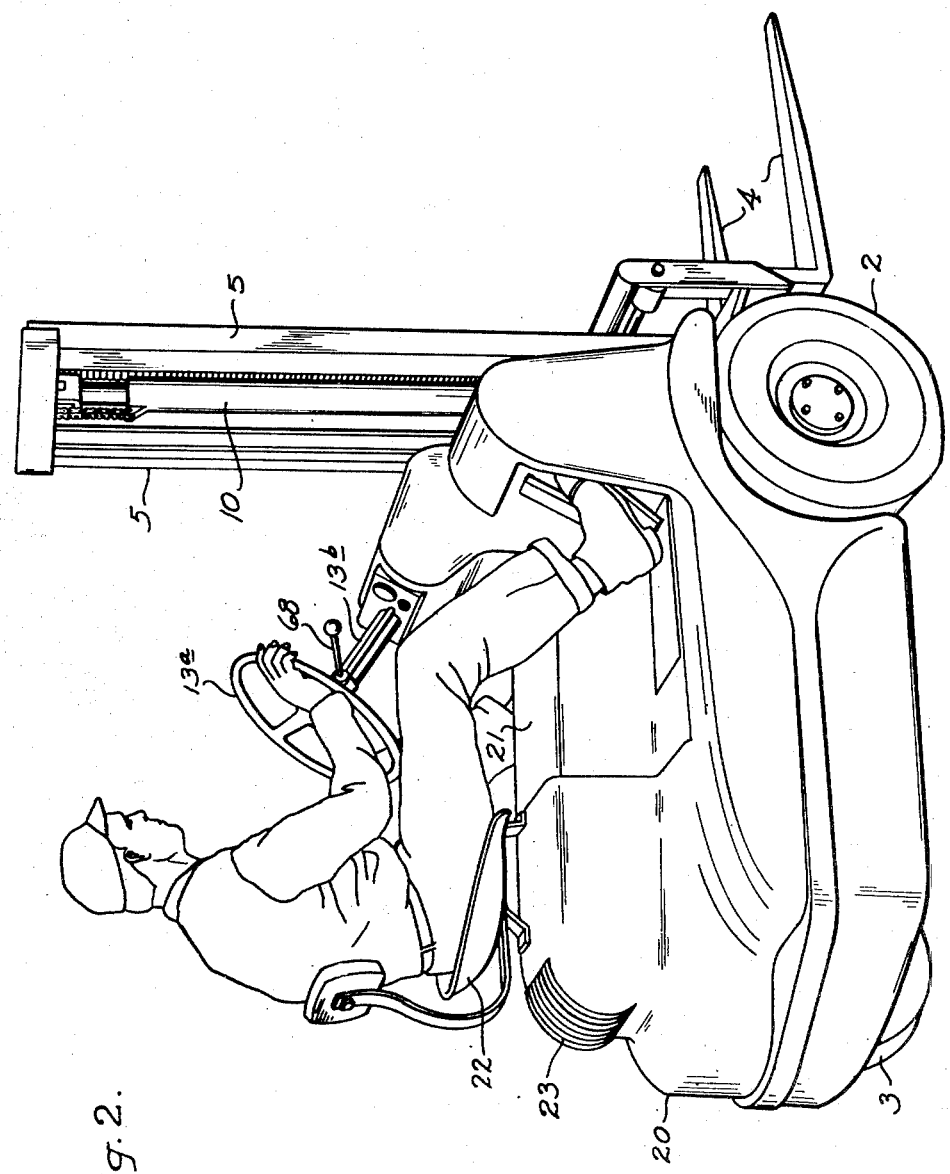
Fig. 2 is a perspective view thereof, showing the manner in which the operator sits in operating said lift truck.

Arranged on said ridged section and at the rear thereof is an operator's seat 22. This is shown most clearly in Fig. 2. Thus an operator seated upon said seat may straddle said ridged section, and, although the body of said lift truck is quite short, convenient distances are provided so that the operator does not ride in a cramped, uncomfortable position. At the rear end of said ridged section is a grill or opening 23, and the forward end of said machine adjacent the radiator is open so that air may be drawn directly through said radiator, about said motor, and through said ridged section and be discharged through said grill or opening 23. Thus cooling air may pass longitudinally through said body without interruption, thus to promote rapid and efficient dissipation of the heat generated by said motor. Also, because of said straight line connection, the heat thus passed through said body passes beneath the operator's seat rapidly, and thus no station is provided adjacent the seat which is uncomfortable to the operator. The body is formed so that the forward end extends upwardly beyond said ridged section and houses the steering column, and the several common controls provided in a vehicle of this character for lifting the fork, adjusting its angular position, controlling the forward and rearward motion of said lift truck, and engaging and disengaging the clutch therefor.

Figure 4:
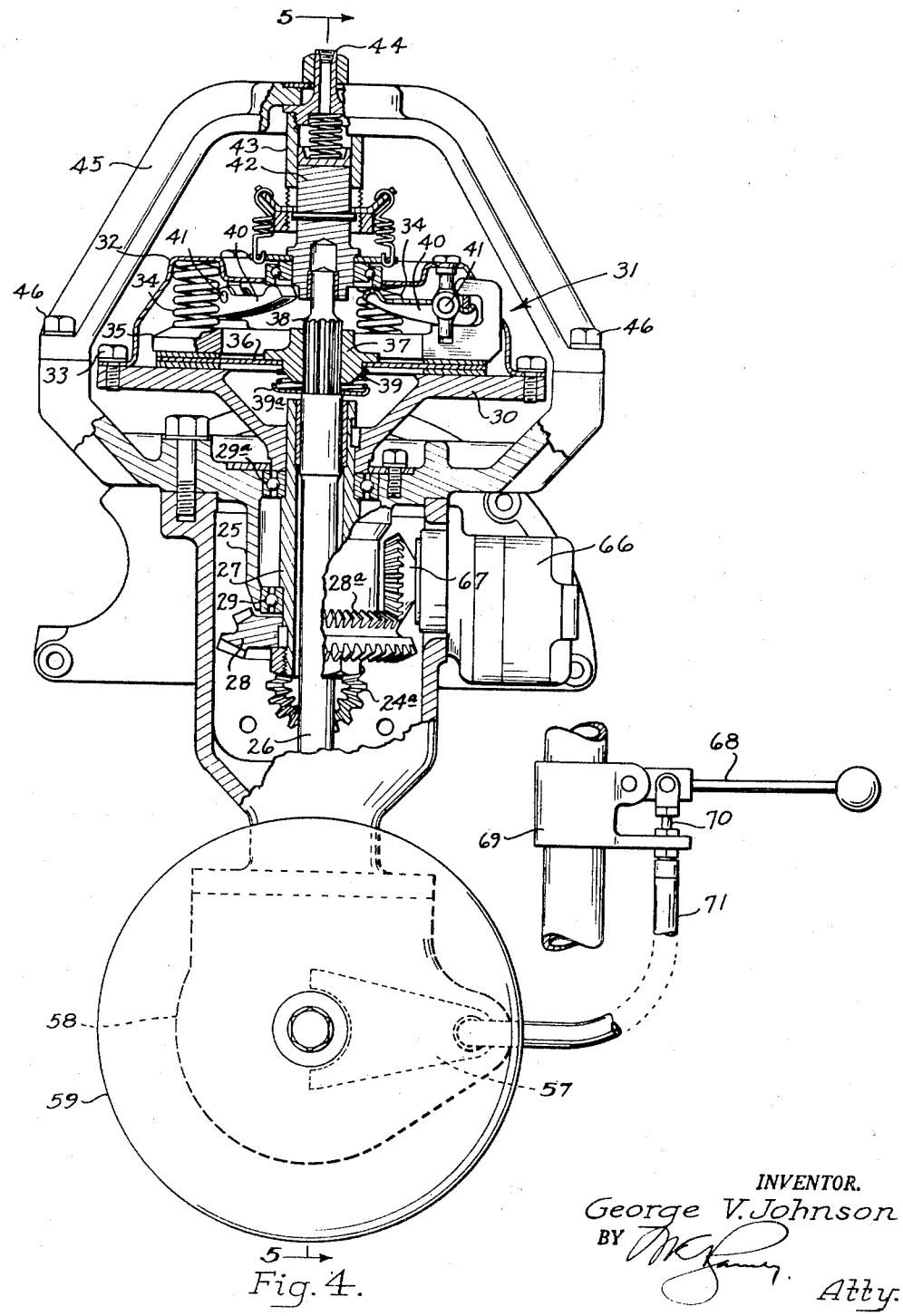
Fig. 4 is a broken section taken substantially on the line 4—4 in Fig. 1, shown on a substantially larger scale, through the power take-off shaft, the clutch, and the connections to the speed change device.
Figure 5:
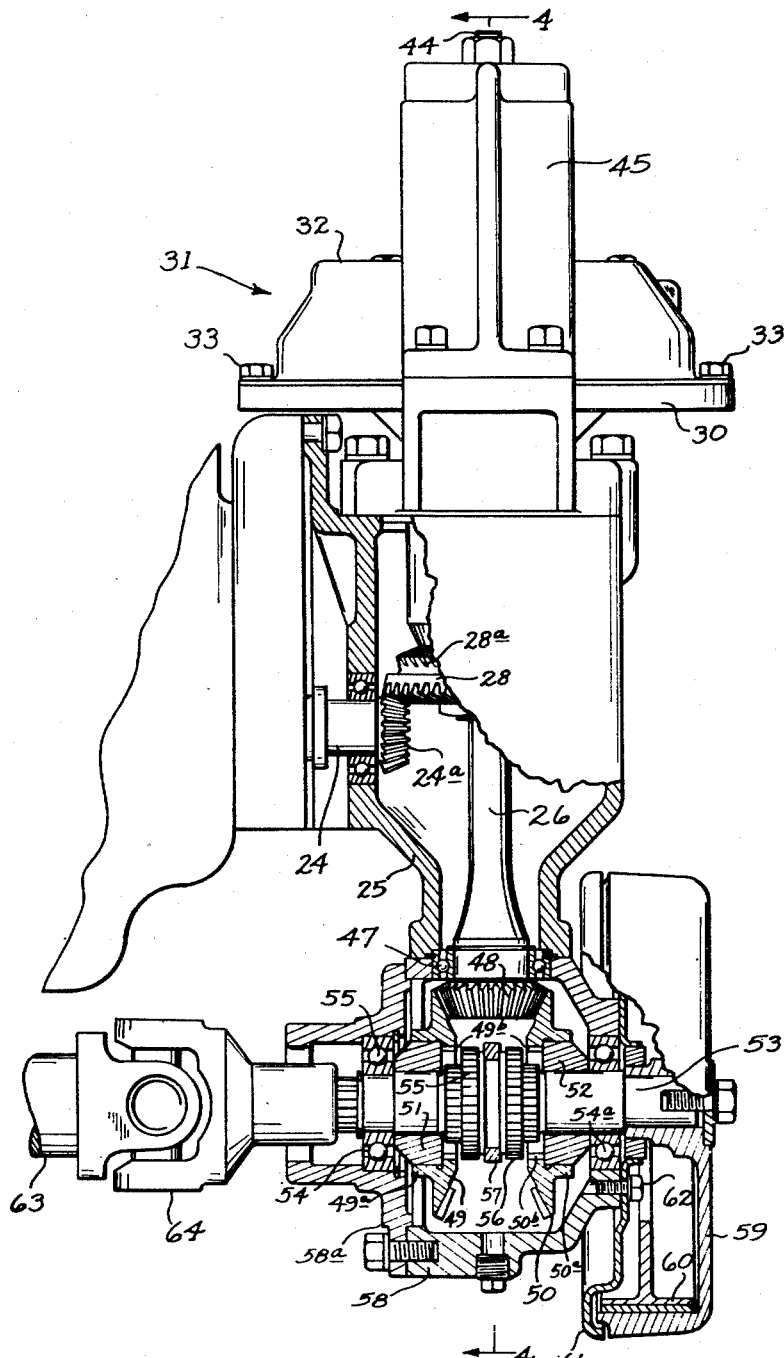
Fig. 5 is a broken section taken substantially on the line 5—5 in Fig. 4.

Next, referring to Figs. 4 and 5, which illustrate the disengageable clutch and speed change mechanisms with which my invention is directly concerned:

A power take-off shaft 24 extends longitudinally of the lift truck and rearwardly from the motor, and it is supported in a housing 25 and carries a driving pinion 24a fixed at the rear extremity thereof. Arranged vertically and centrally of said housing is a shaft 26, about which a sleeve 27 is concentrically mounted. A double-faced gear element 28 is keyed to said sleeve 27. The lower face meshes with the driving pinion 26a, as is shown in both Figs. 4 and 5. Said sleeve is journaled in said housing by spaced anti-friction bearings 29—29a. To the upper end of said sleeve, a clutch plate 30 is secured, and the vertical shaft 26 has bearing therein, as is shown in Fig. 4.

A clutch pressure plate assembly 31 is mounted thereon, which pressure plate assembly is preferably spring engaged. A casing 32 overlies said clutch pressure plate assembly. Said casing is held in position to the clutch plate 30 by means of cap screws 33. A plurality of coiled compression springs 34 bear at their upper ends upon the casing 32 and upon their lower ends on the pressure plate 35. Lying intermediate said pressure plate 35 and the clutch plate 30 is a clutch disc 36, secured to the shaft 26 through a hub 37. Said hub is joined to the shaft by a splined connection 38. The hub is supported by a coiled spring 39 for initiating disengagement of the clutch disc 36 with the clutch plate 30 when pressure is removed from the pressure plate. Said coiled spring is supported by a cup 39a carried by the splined end 38 of the shaft 26. A plurality of fingers 40, pivotally mounted on journal connections 41, are adapted to lift the pressure plate 35 against the compression of the springs 34 to provide disengagement of the clutch. This is accomplished by a piston 42 in cylinder 43. Hydraulic fluid is admitted through connection 44 under pressure. When fluid enters the cylinder 43, it pushes the piston 42 down and the lower end of said piston element bears on the end of fingers 40 and rocks them about their journal connections to lift the ends of said fingers and the connections with the pressure plate so as to disengage the clutch. When pressure is relaxed within said cylinder, the springs force the pressure plate against the disc and the clutch plate so that all of said parts revolve as a unit and operatively connect the sleeve 27 with the shaft 26.

A yoke 45 straddles said clutch and holds said parts in position. When the clutch is to be disassembled for repair or replacement of the parts, this may be accomplished by removing the cap screws 46 and the yoke and lifting the pressure plate assembly from position. It is to be noted that the clutch assembly is arranged uppermost as viewed in Fig. 1, and said clutch assembly lies substantially in the plane of the top of the motor. Thus, when the removable ridge section 20 of the body of the lift truck is removed, said clutch is easily available for replacement or repair, and this is one of the principal features of my structure. That is, the clutch is arranged above the speed change device and at the upper end of the shaft 26. Thus repairs may be made easily and quickly and with minimum inconvenience.

Now, referring to Fig. 5: The shaft 26 is provided with a bearing 47 at its lower end and carries a bevel pinion 48 thereon. Said bevel pinion meshes with and engages a pair of bevel gears 49 and 50, spaced apart. Said gears each have annular flanges 49a and 50a, respectively, thereon which bear upon hubs 51 and 52, respectively. Transmission shaft 53 is supported by bearings 54—54a and has a pair of spaced gears 55—56 thereon which are selectively engageable with annular gear elements 49b and 50b, respectively, on the bevel gears 49 and 50. The gears 55 and 56 are preferably integral and are slidable on a splined portion of the transmission shaft 53, and may be alternately engaged with said gears 49b and 50b. The sliding of gears 55 and 56 is accomplished by a yoke 57. Thus if said gears are moved toward the left by said yoke, the gear 55 engages the annular gear 49b and drives the transmission shaft in one direction. If said gears are moved toward the right by said yoke, then the gear 56 engages the annular gear 56b and rotates the shaft 53 in the opposite direction.

Thus, said selective transmission causes the transmission shaft to rotate in either of two directions, depending upon the throw of the yoke. It is to be understood that, in the body of this specification and in the claims, I refer to this structure as a speed-change device because it changes the drive from forward speed to reverse. It is to be understood that if it is desired to have a series of step-down gears, this may be provided so as to vary the operating speed of said lift truck either forward or reverse, that is, in either of said directions. In practice, however, I have found that a single speed forward and a single speed in reverse is adequate for the usual needs of a lift truck of this character. Said speed-change device is housed within a housing 58, access to which may be had by means of a removable cap 58a.

Secured to the rear end of the transmission shaft 53 is a brake drum 59, and the usual shoes or friction elements 60 are provided to produce a braking effect. Said shoes or friction elements are supported by a shield 61 or other fixed member, the shield being secured to the housing 58 by cap screws 62. Secured to the forward end of said transmission shaft is a drive shaft 63, which is joined at its two ends, respectively, by universal joints 64 and 65 to the transmission shaft 53 and to the driving connection with the axle lying within the hubs 17 and joining the driving wheels 2. It is to be noted that the driving shaft lies beneath the power take-off shaft 24, and said driving shaft 63 is substantially parallel with the axis of said power take-off shaft. The shaft 26 extends vertically; that is, it lies substantially normal to the axes of the power take-off shaft 24 and the drive shaft 63 so as to permit the clutch to lie uppermost, as has previously been discussed.

I preferably operate the several controls for a lift truck by means of hydraulic pressure. To produce and maintain pressure in the hydraulic system, I provide a pump 66, having a bevel gear 67 which meshes with the uppermost gear 28a in the double-face gear element 28, as is illustrated in Fig. 4. I preferably provide a mechanically actuated control for the speed-change device such as a handle 68, pivotally mounted on a bracket 69, clamped to the steering column 13b. Power and motion is transmitted from the handle to the yoke by means of a flexible rod 70, closely encompassed in a conduit 71 so that said rod may exert thrust as well as pull, in the usual manner. Thus as the handle is swung downwardly, said rod is placed under compression to move the yoke 57 in one direction, and when it is lifted upwardly, said rod is subject to tension to move the yoke in the opposite direction. Fluid under pressure is maintained in a reservoir 72 (see Fig. 3), and a valve 73 distributes fluid under pressure through a conduit 74 to the lifting cylinder for the fork 4. Fluid under pressure is transmitted through conduit 75 to the cylinders 8 for the arms 6, and fluid under pressure is transmitted through conduit 76 which leads from the connection 44, to a cylinder 77, actuated by a treadle 78 (see Fig. 1).

Attention is directed to Figs. 4 and 5, in which it may be observed that the pinion 24a is substantially smaller in pitch diameter than is the double face gear element 28. Thus the clutch plate 30 is driven at substantially lower speed than the speed of rotation of the power take-off shaft, and, consequently, there is substantially less wear in said clutch due to said lower operating speed when the friction faces are initially engaged. Said double-face gear 28 lies physically intermediate the clutch mechanism and the speed-change device, but due to the arrangement of said shaft and its encompassing sleeve, operatively the mechanism is arranged so that power flows from the power take-off shaft, through said double face gear element, to the clutch, and from said clutch to the speed change device in the usual manner. The arrangement of said vertical shaft and its encompassing sleeve permits the clutch and the speed-change device to be arranged in stacked relation, so as to minimize the overall length of a vehicle embodying this structure, and also permits the clutch parts to be arranged uppermost so as to provide access thereto for repair or replacement of the operating parts thereof, as has previously been discussed. Said arrangement also permits the parts to be arranged in longitudinal alinement so that cooling of the parts is facilitated and a convenient arrangement is obtained for the operator, even though the overall length of said device is maintained to a minimum.

I claim:

1. A lift truck comprising an elongated wheel mounted frame, a hoisting mechanism at one end thereof and a dirigible wheel support at the other end, having a power plant comprising a motor, clutch and speed change device for selectively driving said truck and operating said hoisting mechanism, said motor having a power take-off shaft extending longitudinally of said lift truck, said power take-off shaft physically joining the clutch and speed change device intermediate the latter.

2. A lift truck comprising an elongated wheel mounted frame, a hoisting mechanism at one end thereof and a dirigible wheel support at the other end, having a power plant comprising a motor, clutch and speed change device for selectively driving said truck and operating said hoisting mechanism, said motor having a power take-off shaft extending longitudinally of said lift truck, said power take-off shaft physically joining the clutch and speed change device intermediate the latter, and said clutch and speed change device being operatively joined together by a shaft whose axis extends substantially normal to that of the power take-off shaft.

3. A lift truck comprising an elongated wheel mounted frame, a hoisting mechanism at one end thereof and a dirigible wheel support at the other end, having a power plant comprising a motor, clutch and speed change device for selectively driving said truck and operating said hoisting mechanism, said motor having a power take-off shaft extending longitudinally of said lift truck, said power take-off shaft physically joining the clutch and speed change device intermediate the latter, and said clutch and speed change device being operatively joined together by a vertically disposed shaft.

4. A lift truck comprising an elongated wheel mounted frame, a hoisting mechanism at one end thereof and a dirigible wheel support at the other end, having a power plant comprisng a motor, clutch and speed change device for selectively driving said truck and operating said hoisting mechanism, said motor having a power take-off shaft extending longitudinally of said lift truck, said power take-off shaft physically joining the clutch and speed change device intermediate the latter, and a step-down gear mechansm operatively joining said power take-off shaft to said clutch to reduce the relative operating speed of said clutch with respect to that of said engine.

5. A lift truck comprising an elongated wheel mounted frame, a hoisting mechanism at one end thereof and a dirigible wheel support at the other end, having a power plant comprising a motor, clutch and speed change device for selectively driving said truck and operating said hoisting mechanism, said motor having a power take-off shaft extending longitudinally of said lift truck, said power take-off shaft physically joining the clutch and speed change device intermediate the latter, said clutch and speed change device being operatively joined together by a vertically disposed shaft, a sleeve rotatably mounted upon said shaft operatively joining the clutch and speed change device, intermeshing gears joining the power take-off shaft and said sleeve, said sleeve carrying one of the plates for said clutch, and means for engaging and disengaging said clutch.

6. A lift truck comprising an elongated wheel mounted frame, a body thereon, a hoisting mechanism at one end thereof and a dirigible wheel support at the other end, having an operator's seat on the top of said body, overlying said dirigible wheel support, a power plant comprising a motor, clutch and speed change device for selectively driving said truck and operating said hoisting mechanism, said power plant being arranged in line intermediate the hoisting mechanism and the dirigible wheel support, and a relatively narrow ridged section of said body overlying said power plant having lateral portions projecting from said ridge and constituting a floor adjacent the operator's seat.

7. A lift truck comprising an elongated wheel mounted frame, a body thereon, a hoisting mechanism at one end thereof and a dirigible wheel support at the other end, having an operator's seat on the top of said body, overlying said dirigible wheel support, a power plant comprising a motor, clutch and speed change device for selectively driving said truck and operating said hoisting mechanism, said power plant being arranged in line intermediate the hoisting mechanism and the dirigible wheel support, a relatively narrow ridged section of said body overlying said power plant having lateral portions projecting from said ridge and constituting a floor adjacent the operator's seat, said ridge extending in alinement with the operator's seat.

8. A lift truck comprising an elongated wheel mounted frame, a body thereon, a hoisting mechanism at one end thereof and a dirigible wheel support at the other end, having an operator's seat on the top of said body, overlying said dirigible wheel support, a power plant comprising a motor, clutch and speed change device for selectively driving said truck and operating said hoisting mechanism, said power plant being arranged in line intermediate the hoisting mechanism and the dirigible wheel support, a relatively narrow ridged section of said body overlying said power plant having lateral portions projecting from said ridge and constituting a floor adjacent the operator's seat, said ridge being apertured at the ends thereof and being closed at the sides thereof, thereby constituting a cooling tunnel extending rearwardly from said power plant.

9. A lift truck comprising an elongated wheel mounted frame, a hoisting mechanism at one end thereof and a dirigible wheel support at the other end, having a power plant comprising a motor, clutch and speed change device for selectively driving said truck and operating said hoisting mechanism, said power plant being arranged in line intermediate the hoisting mechanism and the dirigible wheel support, a relatively narrow ridged section of said body overlying said power plant, said ridge being apertured at the ends thereof and being closed at the sides thereof, thereby constituting a cooling tunnel extending rearwardly from said power plant.

GEORGE V. JOHNSON.

REFERENCES CITED

The following references are of record in the file of this patent:

UNITED STATES PATENTS

| Number | Name | Date |
|---|---|---|
| 1,181,634 | Bivert | May 2, 1916 |
| 1,308,314 | Wilcox | July 1, 1919 |
| 1,986,134 | Burrows et al. | Jan. 1, 1935 |
| 2,000,709 | Matthews | May 7, 1935 |
| 2,094,290 | Brobson | Sept. 28, 1937 |
| 2,243,035 | Hilkemeier | May 20, 1941 |
| 2,362,129 | Gfrorer | Nov. 7, 1944 |
| 2,368,121 | Dunham | Jan. 30, 1945 |
| 2,428,223 | Johnson | Sept. 30, 1947 |
| 2,435,930 | Schjolin | Feb. 10, 1948 |

FOREIGN PATENTS

| Number | Country | Date |
|---|---|---|
| 308,636 | Great Britain | Mar. 25, 1929 |
| 479,805 | Great Britain | Feb. 11, 1938 |
| 813,171 | France | May 27, 1937 |